United States Patent
Turunc et al.

(10) Patent No.: US 12,187,949 B2
(45) Date of Patent: Jan. 7, 2025

(54) METHOD AND COMPOSITION FOR IMPROVING HANDLING OF BULK MATERIALS

(71) Applicant: BL TECHNOLOGIES, INC., Minnetonka, MN (US)

(72) Inventors: Umit Turunc, Trevose, PA (US); Michael Raab, Trevose, PA (US); Bryce Anden Uytiepo, Blue Bell, PA (US)

(73) Assignee: BL TECHNOLOGIES, INC., Minnetonka, MN (US)

( * ) Notice: Subject to any disclaimer, the term of this patent is extended or adjusted under 35 U.S.C. 154(b) by 1149 days.

(21) Appl. No.: 16/970,112

(22) PCT Filed: Feb. 19, 2018

(86) PCT No.: PCT/US2018/018608
§ 371 (c)(1),
(2) Date: Aug. 14, 2020

(87) PCT Pub. No.: WO2019/160561
PCT Pub. Date: Aug. 22, 2019

(65) Prior Publication Data
US 2020/0407612 A1    Dec. 31, 2020

(51) Int. Cl.
*C09K 3/22* (2006.01)
*C08K 5/053* (2006.01)
*C08L 23/22* (2006.01)

(52) U.S. Cl.
CPC ............... *C09K 3/22* (2013.01); *C08L 23/22* (2013.01); *C08K 5/053* (2013.01)

(58) Field of Classification Search
CPC ............ C09K 3/22; C08L 23/22; C08K 5/053
See application file for complete search history.

(56) References Cited

U.S. PATENT DOCUMENTS 4,780,233 A * 10/1988 Roe .......................... C09K 3/22
516/18
7,270,879 B2    9/2007 McCrary

FOREIGN PATENT DOCUMENTS

CN    105 950 023 A    9/2016
KR    2017 0038728 A    4/2017

OTHER PUBLICATIONS

Yan et al. "Dust Suppression with glycerin from Biodiesel Production: A Review" Journal of Environmental Protection, 2012, 3, p. 218-224 (Year: 2012).*
Luna et al. "Studies on biodegradability of bio-based lubricants", Tribology International, 92 (2015) p. 301-306 (Year: 2015).*
International Search Report and Written Opinion issued in International Application No. PCT/US2018/018608 dated Oct. 17, 2018; 24 pages.
Office Action Issued in European Application No. 18709839.7, dated Sep. 21, 2021, 4 pages.

* cited by examiner

*Primary Examiner* — Andrew J. Oyer
(74) *Attorney, Agent, or Firm* — McCarter & English, LLP

(57) ABSTRACT

A dust suppression composition having a biodegradable liquid; and at least one elastomeric organic resin. A method of reducing fugitive emissions from bulk and granular materials, the method provides preparing a dust suppression composition, the composition having a biodegradable liquid and at least one elastomeric organic resin; and applying the dust suppression composition to the bulk or granular materials.

12 Claims, No Drawings

METHOD AND COMPOSITION FOR IMPROVING HANDLING OF BULK MATERIALS

CROSS-REFERENCE TO RELATED APPLICATION

This application is a national phase of International Patent Application No. PCT/US2018/018608 filed Feb. 19, 2018, the entirety of which is incorporated by reference herein.

FIELD OF INVENTION

The disclosed technology generally described hereinafter provides a dust suppression composition and method of application thereof.

BACKGROUND OF THE INVENTION

Fugitive emissions of dust and fine particles from bulk and granular materials during handling is a significant environmental, safety and health concern. Water is the most common short term solution to controlling of fugitive emissions from bulk and granular materials. Water is usually applied as a spray or mist at dust generating locations or operations, such as conveyor belt transfer points, chutes, hoppers, bunkers, size reduction equipment (e.g. crushers, grinding mills), during stack-out or reclamation from storage areas, during loading and emptying of bulk material transportation vessels, vehicles, and containers (e.g. rail cars, trucks, barges, ships, and bags).

However, the disadvantages to using water to control fugitive emissions is multifold. Water only has a short term effect, as it can quickly evaporate off the dust generating material. Additionally, due to its quick evaporation, and hence short term effect, water must be reapplied frequently to control dust. Commonly, many materials are either moisture sensitive (e.g. grains) or have strict moisture limits (e.g. coal), and thus water is not an effective solution to controlling emissions. Further, on highly hydrophobic materials (such as petroleum coke), water is ineffective, as the substrate will not wet or adsorb moisture. Lastly, excess moisture can cause significant mechanical issues by making the substrate "sticky." Such issues include, but are not limited to, blocked chutes, conveyor belt carry back, and jammed crushers. Due to these considerations, what is needed in the art is a dust control/suppression composition that has long term dust control efficacy.

SUMMARY OF THE INVENTION

The disclosed technology generally described hereinafter provides for a dust suppression composition and method of application thereof. According to one aspect of the disclosed technology, a dust suppression composition is provided. The dust suppression composition comprises a biodegradable liquid and at least one elastomeric organic resin.

In some embodiments, the biodegradable liquid is non-toxic and non-flammable. In some embodiments, the biodegradable liquid is glycerin, glycerol, polyglycerol, polyethylene glycol, polypropylene glycol, polyol, or combination thereof. In some embodiments, the at least one elastomeric organic resin is a synthetic or natural elastomeric organic resin. In some embodiments, the at least one elastomeric resin comprises natural rubber, nitrile rubber, polyisobutylene, butyl rubber, polychloroprene, styrene-butadiene rubber, ethylene-propylene diene rubber, polydialkyl siloxanes, polyurethanes, and polyvinyl methyl ether.

In some embodiments, the dust suppression composition further comprising at least one industrial co-product or by-product. In some embodiments, the industrial by-product is obtained from the pulp and paper industry, corn milling industry, sugar and starch processing industry, or biofuel industry. In some embodiments, the industrial co-product is a lignin, ligno-sulfonate, sugar, molasses, modified starches, unmodified starches, crude vegetable oil, refined vegetable oil, or vegetable oil by-products.

In some embodiments, the composition comprises at least 99 wt. % biodegradable liquid and less than 1 wt. % elastomeric organic resin. In other embodiments, the composition comprises at least 99 wt. % crude glycerin and less than 1 wt. % polyisobutylene.

In yet another aspect of the disclosed technology, a method of reducing fugitive emissions from bulk and granular materials is provided. The method comprises preparing a dust suppression composition, the composition comprising: a biodegradable liquid and at least one elastomeric organic resin; and applying the dust suppression composition to the bulk or granular materials.

In some embodiments, the biodegradable liquid is glycerin, glycerol, polyglycerol, polyethylene glycol, polypropylene glycol, polyol, or combination thereof. In some embodiments, the at least one elastomeric organic resin is a synthetic or natural elastomeric organic resin. In some embodiments, the at least one elastomeric resin comprises natural rubber, nitrile rubber, polyisobutylene, butyl rubber, polychloroprene, styrene-butadiene rubber, ethylene-propylene diene rubber, polydialkyl siloxanes, polyurethanes, and polyvinyl methyl ether.

In some embodiments, the dust suppression composition is applied as an undiluted or diluted solution. In some embodiments, the dust suppression composition is applied at a dosage of at least 400 ppm. In some embodiments, the dust suppression composition is applied as a spray or as a foam. In some embodiments, the dust suppression composition is applied to the granular materials during any one or more of the extraction, production, processing, handling, storage, and transportation stages. In some embodiments, the bulk and granular materials comprise coal, coke, urea, mineral ores, mineral concentrates, fly-ash, coal combustion residue, phosphate rock, fertilizers, limestone, crushed stone, aggregates, sand, wood chips, saw-dust, waste derived fuels, hog fuel, iron ore pellets, and agricultural products such as grains, grain products, spent brewers and distillers' grains, animal feeds, or combinations thereof.

In yet another aspect of the disclosed technology, a dust suppression composition is provided. The dust suppression composition comprises a biodegradable liquid; and one or more compounds selected from (a) an elastomeric organic resin; and (b) an industrial co-product or by-product.

DETAILED DESCRIPTION OF EXEMPLARY EMBODIMENTS

The disclosed technology generally described hereinafter provides a dust suppression composition and method of application thereof. The disclosed technology significantly reduces fugitive emissions of dust and fine particles from bulk and granular materials during materials handling operations by applying a dust suppressing composition that bind or adhere or agglomerate dust and fine particles, and prevent these particles from becoming airborne during material handling operations.

Fugitive emissions of dust and fine particles from bulk and granular materials are common in the material handling processes, which include, but are not limited to mining, mineral processing, excavation, construction, civil-engineering, mineral ores and fuels extraction, transportation, storage and reclamation, processing and production of agricultural and forestry products and by-products. The dust control/suppression composition and method of application herein can be used in such industries and are far more cost effective than water, thus saving significant quantities of water, while reduced moisture addition significantly reduces mechanical issues due to "stickiness". Stickiness should be readily understood to mean a situation where granular materials contain excessive moisture levels. The excessive moisture can cause the granular materials to adhere to various material handling devices and machinery, which cause mechanical and operational problems.

The dust suppression composition comprises a biodegradable liquid and at least one elastomeric organic resin. The biodegradable liquid of the present technology is generally non-toxic and non-flammable. In contrast to commonly available dust suppression/control compositions, which include a base of long term dust control agents and binders that can be mineral and or petroleum oils, the present dust suppression composition is biodegradable. For instance, most industrial customers, in products that are used outdoors, generally prefer biodegradable products, as it is more environmentally friendly and thus easier to comply with regulations or public perceptions.

In some embodiments, the dust suppression composition comprises at least one biodegradable liquid, and in other embodiments, one or more biodegradable liquids. In some embodiments, the biodegradable liquid is glycerin, glycerol, polyglycerol, polyethylene glycol, polypropylene glycol, polyol, or combinations thereof.

The elastomeric organic resin of the present technology can be either a synthetic elastomeric organic resin or natural elastomeric organic resin. In some embodiments, the resins and elastomers described herein are active ingredients in adhesives, glues, and coatings. Inherently, dust control compounds function by binding the small particles or fines together or onto larger particles, (i.e. the compounds agglomerate the dust causing fraction of the granular materials into larger particles, which are less likely to become airborne during material handling processes. By incorporating these resins into the dust control compounds, the adhesive or binding quality of the compounds are improved. In some embodiments, the dust suppression composition comprises at least one elastomeric organic resin, and in other embodiments, one or more elastomeric organic resins.

In some embodiments, the elastomeric resin comprises natural rubber, nitrile rubber, polyisobutylene, butyl rubber, polychloroprene, styrene-butadiene rubber, ethylene-propylene diene rubber, polydialkyl siloxanes, polyurethanes, and polyvinyl methyl ether.

In some embodiments, the dust suppression composition of the present disclosure comprises at least 99 wt. % biodegradable liquid and less than 1 wt. % elastomeric organic resin. In some embodiments, the dust suppression composition of the present disclosure comprises at least 99.5 wt. % biodegradable liquid and less than 0.5 wt. % elastomeric organic resin. In other embodiments, the dust suppression composition of the present disclosure comprises at least 99.6 wt. % biodegradable liquid and less than 0.4 wt. % elastomeric organic resin. In other embodiments, the dust suppression composition of the present disclosure comprises at least 99.8 wt. % biodegradable liquid and less than 0.2 wt. % elastomeric organic resin. In a specific embodiment, the composition comprises at least 99 wt. % crude glycerin and less than 1 wt. % polyisobutylene.

The dust suppression composition of the present disclosure provides increased dust reduction of bulk and granular materials, thus providing a reduction in the fugitive emissions from the dust and fine particles. The effectiveness of the dust suppression composition can be measured by comparing the dust index of a sample of the untreated granular material versus the dust index of a sample of the granular material that has been treated with the dust suppression compound. For example, the dust index can be determined by using a Microtrac™ DustMon L laboratory dust measurement apparatus, or the like.

In some embodiments, the dust suppression composition further comprises industrial co-products or by-products. The industrial co-product can be obtained from industries such as, but not limited to, the pulp and paper industry, corn milling industry, sugar and starch processing industry, biofuel industry, or the like.

In some embodiments, the dust suppression composition of the present disclosure comprises at least 50 wt. % biodegradable liquid, at least 0.1 wt. % elastomeric organic resin, and at least 1 wt. % of an industrial co-product.

The industrial by-product can be a lignin, ligno-sulfonate, sugar, molasses, modified starches, unmodified starches, crude vegetable oil, refined vegetable oil, vegetable oil by-products, or the like.

In a specific embodiment, the dust suppression composition comprises a biodegradable liquid, and one or more compounds selected from (a) an elastomeric organic resin, and (b) an industrial co-product or by-product. In some embodiments, the dust suppression composition of the present disclosure comprises at least 50 wt. % biodegradable liquid, at least 0.1 wt. % elastomeric organic resin, and at least 1 wt. % of an industrial co-product or by-product.

The disclosed technology further provides for a method of reducing fugitive emissions from bulk and granular materials. The method comprises preparing a dust suppression composition, and applying the dust suppression composition to bulk or granular materials.

The effectiveness of the disclosed method can be measured by the percent dust reduction or dust suppression (% DS). In some embodiments, the percent dust suppression is at least 80%, in other embodiments, at least 85%, in other embodiments, at least 90%, in other embodiments, at least 96%, and in other embodiments, at least 97%.

The dust suppression composition of the present method comprises a biodegradable liquid and at least one elastomeric organic resin. In some embodiments of the present method, the biodegradable liquid is glycerin, glycerol, polyglycerol, polyethylene glycol, polypropylene glycol, polyol, or combination thereof. In some embodiments of the present method, the at least one elastomeric organic resin is a synthetic or natural elastomeric organic resin. In some embodiments of the present method, the at least one elastomeric resin comprises natural rubber, nitrile rubber, polyisobutylene, butyl rubber, polychloroprene, styrene-butadiene rubber, ethylene-propylene diene rubber, polydialkyl siloxanes, polyurethanes, and polyvinyl methyl ether. In other embodiments of the present method, the dust suppression composition comprises biodegradable liquid, at least one elastomeric organic resin, and an industrial co-product or by-product.

Application of the dust suppression composition can be achieved in a number of ways. The dust suppression composition can be applied to the granular materials during any one or more of the extraction, production, processing, handling, storage, and transportation stages. Examples of the bulk and granular materials include, but are not limited to, coal, coke, urea, mineral ores, mineral concentrates, fly-ash, coal combustion residue (CCR), phosphate rock, fertilizers, limestone, crushed stone, aggregates, sand, wood chips, saw-dust, waste derived fuels (WDF), hog fuel, iron ore pellets, and agricultural products such as grains, grain products, spent brewers and distillers' grains, animal feeds, or combinations thereof.

In some embodiments, the dust suppression composition can be applied undiluted or neat. For example, where the addition of moisture to the granular material is undesirable, neat or undiluted application of the dust suppression composition eliminates the moisture addition. Also, neat addition does not require equipment or apparatus for diluting the dust suppression composition, hence simplifying the application for the end user.

In some embodiments, the dust suppression composition can be applied as a diluted solution. In such embodiments, the dust suppression composition is applied at a dosage of at least 400 ppm, and in other embodiments, of at least 500 ppm.

In other embodiments, the dust suppression composition is applied as a spray or as a foam.

EXAMPLES

Testing of the relative dustiness of bulk solids was measured using a Microtrac™ DustMon L laboratory dust measurement apparatus. The sample was loaded into a funnel. Measurement of the sample begins when valve opens and the sample drops into the sample chamber. Dust contained in the sample will disperse in the chamber, between the light source and the detector located within the measurement apparatus. The light intensity detected by the detector will decrease in proportion to the dispersed dust particles in the chamber, where the light intensity correlates directly with the dust levels in the sample. Subsequently, an algorithm calculates the dust index.

The apparatus generates a dust index (DI) for each tested sample. The effectiveness of composition and methods of the present technology was tested by respectively measuring the dust index of the untreated granular material, and the dust index of the granular material treated with the dust suppression composition. Percent dust suppression/reduction (% DS) was calculated according to following formula:

(% DS)=[(DI untreated−DI treated)/DI untreated]×100

A dusty sand and clay mixture was treated with a crude glycerin alone and with mixtures of the crude glycerin and polyisobutylene (PIB) resin, to evaluate dust suppression of the invention. The sample formulas tested are shown in Table 1 below:

TABLE 1

| Formula | A | B | C |
| --- | --- | --- | --- |
| Crude glycerin (%) | 100 | 99.68 | 99.84 |
| PIB (%) | 0 | 0.32 | 0.16 |

Each treatment was added to the substrate at a dosage of about 400 ppm, which is equivalent to 400 grams per ton of substrate and the dustiness of the substrate with and without treatment was evaluated. The results are shown in Table 2:

TABLE 2

| Sample | Dust reduction % (% DS) |
| --- | --- |
| No treatment | 0 |
| A | 84.4 |
| B | 97.6 |
| C | 96.8 |

Compared to treatment with only crude glycerin (A), the inventive formulas (B and C) significantly improved dust suppression with the addition of PIB.

While embodiments of the disclosed technology have been described, it should be understood that the present disclosure is not so limited and modifications may be made without departing from the disclosed technology. The scope of the disclosed technology is defined by the appended claims, and all devices, processes, and methods that come within the meaning of the claims, either literally or by equivalence, are intended to be embraced therein.

The invention claimed is:

1. A dust suppression composition, the composition comprising:
   a biodegradable liquid comprising glycerol; and
   at least one elastomeric organic resin comprising polyisobutylene,
   wherein the composition comprises at least 99 wt % biodegradable liquid and less than 1 wt % elastomeric organic resin.

2. The dust suppression composition as in claim 1, wherein the at least one elastomeric resin further comprises natural rubber, nitrile rubber, butyl rubber, polychloroprene, styrene-butadiene rubber, ethylene-propylene di ene rubber, polydialkyl siloxanes, polyurethanes, or polyvinyl methyl ether.

3. The dust suppression composition as in claim 1, further comprising at least one industrial co-product or by-product.

4. The dust suppression composition as in claim 3, wherein the industrial by-product is obtained from the pulp and paper industry, corn milling industry, sugar and starch processing industry, or biofuel industry.

5. The dust suppression composition as in claim 3, wherein the industrial co-product is a lignin, ligno-sulfonate, sugar, molasses, modified starches, unmodified starches, crude vegetable oil, refined vegetable oil, or vegetable oil by-products.

6. A method of reducing fugitive emissions from bulk and granular materials, the method comprising:
   preparing a dust suppression composition, the composition comprising:
      a biodegradable liquid comprising glycerol and at least one elastomeric organic resin comprising polyisobutylene, wherein the composition comprises at least 99 wt % biodegradable liquid and less than 1 wt % elastomeric organic resin; and
   applying the dust suppression composition to the bulk or granular materials.

7. The method of reducing fugitive emissions as in claim 6, wherein the at least one elastomeric resin further comprises natural rubber, nitrile rubber, butyl rubber, polychloroprene, styrene-butadiene rubber, ethylene-propylene diene rubber, polydialkyl siloxanes, polyurethanes, or polyvinyl methyl ether.

8. The method of reducing fugitive emission as in claim 6, wherein the dust suppression composition is applied as an undiluted or diluted solution.

9. The method of reducing fugitive emissions as in claim 6, wherein the dust suppression composition is applied at a dosage of at least 400 ppm.

10. The method of reducing fugitive emissions as in claim 6, wherein the dust suppression composition is applied as a spray or as a foam.

11. The method of reducing fugitive emissions as in claim 6, wherein the dust suppression composition is applied to the granular materials during any one or more of the extraction, production, processing, handling, storage and transportation stages.

12. The method of reducing fugitive emissions as in claim 6, wherein the bulk and granular materials comprise coal, coke, urea, mineral ores, mineral concentrates, fly-ash, coal combustion residue, phosphate rock, fertilizers, limestone, crushed stone, aggregates, sand, wood chips, saw-dust, waste derived fuels, hog fuel, iron ore pellets, and agricultural products such as grains, grain products, spent brewers and distillers' grains, animal feeds, or combinations thereof.

* * * * *